United States Patent [19]

Langley et al.

[11] Patent Number: 5,681,480
[45] Date of Patent: Oct. 28, 1997

[54] DEWATERING OF AQUEOUS SUSPENSIONS

[75] Inventors: John Graham Langley, Leeds, England; Philip Anson Ford, Suffolk, Va.; Stephen Robert Tremont, Portage, Mich.; Brian Frederic Satterfield, Columbia, S.C.

[73] Assignee: Allied Colloids Limited, United Kingdom

[21] Appl. No.: 532,504

[22] Filed: Sep. 22, 1995

Related U.S. Application Data

[63] Continuation-in-part of Ser. No. 190,077, Feb. 1, 1994, abandoned.

[30] Foreign Application Priority Data

Aug. 2, 1991 [GB] United Kingdom ............... 91167015

[51] Int. Cl.⁶ ............................................... C02F 1/56
[52] U.S. Cl. ...................... 210/727; 162/5; 162/189; 210/734; 210/735; 210/928
[58] Field of Search ................. 162/5, 189; 210/712, 210/725, 727, 728, 734, 735, 736, 917, 928

[56] References Cited

U.S. PATENT DOCUMENTS

| | | | |
|---|---|---|---|
| 1,982,129 | 3/1934 | Wells | 162/5 |
| 3,300,406 | 1/1967 | Pollio | 210/727 |
| 3,617,568 | 11/1971 | Ries, Jr. | 210/727 |
| 4,425,238 | 1/1984 | Degen et al. | 210/666 |
| 4,720,346 | 1/1988 | Flesher et al. | 210/734 |
| 4,835,206 | 5/1989 | Farrar et al. | 524/457 |
| 5,013,456 | 5/1991 | St. John et al. | 210/734 |
| 5,071,587 | 12/1991 | Perman | 252/181 |
| 5,200,086 | 4/1993 | Shah et al. | 210/708 |
| 5,269,942 | 12/1993 | Harrington, IV et al. | 210/727 |
| 5,286,390 | 2/1994 | Gray et al. | 210/727 |

FOREIGN PATENT DOCUMENTS

| | | |
|---|---|---|
| 0 235 893 | 1/1987 | European Pat. Off. |
| 0 406 105 A1 | 6/1990 | European Pat. Off. |
| 1472923 | 12/1964 | France |
| 867450 | 5/1961 | United Kingdom |

*Primary Examiner*—Peter A. Hruskoci
*Attorney, Agent, or Firm*—Dickstein Shapiro Morin & Oshinsky, LLP

[57] ABSTRACT

A mill waste or deinking waste or other suspension containing cellulosic material and hydrophobic material is flocculated by a cationic polymeric flocculant and the flocculated material, is then aggregated by a swelling clay or other anionic colloidal material, optionally further cationic flocculant is added, and the aggregated material is then separated by belt pressing or other pressure filtration as a cake.

11 Claims, 1 Drawing Sheet

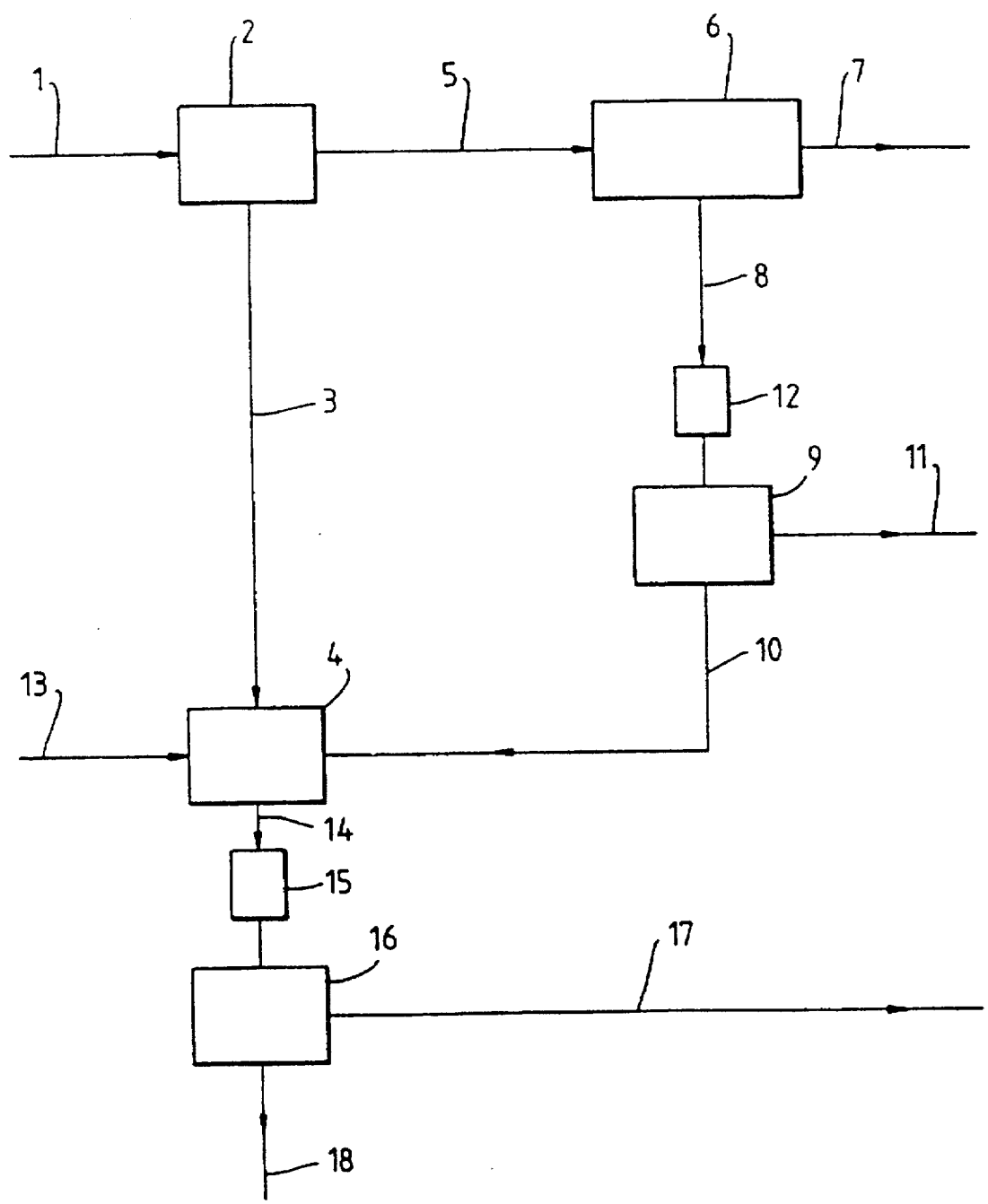

DEWATERING OF AQUEOUS SUSPENSIONS

RELATED APPLICATION

This application is a continuation-in-part of Ser. No. 08/190,077 filed 1 Feb. 1994 now abandoned, as an application under 35 USC 371 of PCT/GB92/01430 of 3 Aug. 1992 by John Graham Langley, Philip Anson Ford, Stephen Robert Tremont and Brian Frederick Satterfield.

FIELD OF THE INVENTION

This invention relates to a process for separating suspended solids from an aqueous suspension, wherein the process includes a dewatering stage that is conducted by pressure filtration to produce a cake. The invention relates in particular to such processes wherein the suspension contains hydrophobic material such as ink particles and also cellulosic fibre. In particular, the invention relates to the separation of cellulosic and hydrophobic solids as a cake from mill waste and deinking waste.

It is well known to add a flocculant material to a suspension so as to cause the suspended material to flocculate before dewatering. Suitable flocculants for this purpose include alum and other polyvalent metal salts, bentonite, and various natural or synthetic polymers that can be non-ionic, anionic or cationic. In some instances combinations are known, for instance bentonite followed by a polymer. Some of the flocculant materials might be considered, more accurately, to be coagulants rather than flocculants.

The choice of flocculant is dictated by the particular process steps that are involved, the materials that are being flocculated, and the economics of the process. For instance a process that is designed to make a product that can be sold may justify a more expensive flocculant than a process designed to make a waste product. Similarly, a process designed to flocculate essentially hydrophilic materials will generally require different flocculants from a process designed to flocculate essentially hydrophobic materials.

A flocculation process useful in the production of paper is commercialised under the trade name "Hydrocol" and is described in EP-A-235893. In this a substantially linear synthetic cationic polymer having molecular weight above 500,000 is added to a cellulosic suspension to form flocs which are then broken down by shearing to form microflocs, and bentonite is then added to the sheared suspension, which is then drained through a screen to form a paper sheet. This sheet can then be dried over hot rolls or in an oven. It is essential in this process to apply sufficient shear to break the initial flocs down to microflocs as otherwise the paper that is formed by drainage through the screen will have bad formation and there will be inefficient drying of the paper in the oven or over the hot rolls because moisture will be trapped in the flocs.

It is known from U.S. Pat. No. 3,300,406 and U.S. Pat. No. 4,425,238 to absorb organic material onto bentonite or other anionic colloidal material and to flocculate this using a flocculating agent. In particular, in U.S. Pat. No. 4,425,238 a cationic polymeric assistant and a mineral absorbent can be added to remove anionic compounds from an aqueous system and the removal can be accelerated by the addition of a flocculant. In an example, the drainage rate of a newsprint stock containing humic acid is improved by adding to the stock bentonite, a drainage assistant based on an ethylene imine product and a drainage aid based on a grafted cross-linked ethylene imine polymer.

None of these processes are of relevance to the serious problem of producing a cake of the solids from mill waste or deinking waste or other crude cellulosic suspension containing hydrophobic material. In particular, the objective in such processes is to produce a cake having as high a solids content, and as low a moisture content, as possible. The provision of a high drainage rate may be of little or no relevance to the production of a cake having high solids content and indeed some processes that give a high drainage rate tend to produce a dewatered product having unacceptably low solids content.

There is therefore a serious need to produce a cake from mill waste or deinking waste wherein the cake has a solids content as high as is possible. Naturally it is necessary, however, that the dewatering should be conducted at an adequately fast rate since the process would become uneconomic if the desired high solids content could only be achieved in an unacceptably slow process.

The known way of dewatering mill waste or deinking waste to produce a cake comprises adding a high molecular weight (for instance intrinsic viscosity above 4 dl/g) flocculant to the waste so as to flocculate it, followed by pressure filtration to form the cake. It would be desirable to be able to obtain an improved combination of solids content of the cake, filtration rate, and filtrate clarity.

OBJECTS OF THE INVENTION

An object of the invention is to provide a process for separating the solids from mill waste, deinking waste or other hydrophobic cellulosic suspension as a cake by pressure filtration. A further object is to provide such a process whereby the cake can have an improved combination of solids content, filtration rate and filtrate clarity. A further object is to provide such a process which gives improved solids content while maintaining satisfactory filtration rate and filtrate clarity.

SUMMARY OF THE INVENTION

A process according to the invention for separating suspended solids from an aqueous suspension of suspended solids comprising cellulosic fibres and hydrophobic material comprises flocculating the suspended material by mixing a cationic polymeric flocculant into the suspension, aggregating the flocculated material by mixing an anionic colloidal material into the flocculated suspension, and separating the aggregated material from the suspension by pressure filtration.

BRIEF DESCRIPTION OF THE DRAWING

The drawing shows a flow diagram of a preferred embodiment of the instant process.

DESCRIPTION OF THE PREFERRED EMBODIMENTS

The pressure filtration can be effected by centrifugal dewatering (since the centrifugal force will have the effect of applying pressure) or by any other conventional pressure filtration system such as a filter press, screw press, belt press or tube press.

The invention has the advantage that it permits the dewatering stage to be conducted very rapidly and very efficiently and it can be performed to give a cake having a higher solids content than is often obtained by conventional processes. The invention can result in fast dewatering and good filtrate clarity while maintaining or improving the solids content of the cake.

The suspension that is to be dewatered usually contains general paper-mill effluent solids. These will contain cellulosic fibres, including fibrils and other degraded fibres, but will also contain hydrophobic material. This hydrophobic material may be "stickies" and other hydrophobic residues that originate from the raw pulp used in paper-making but often some of the hydrophobic material is hydrophobic material introduced by the use of recycled paper, for instance adhesives or binders in the recycled paper or, especially, inks in the recycled paper. The invention can therefore be applied to mixed mill waste. Preferably the invention is applied to deinking waste, either as generated in a deinking process or after admixture with other mill effluent solids.

The suspension that is to be treated usually has a solids content of at least 0.05% and preferably at least 0.1%. Often it is at least 0.5%. The solids content is generally below 10% and often below 5%. Solids contents in the range 0.1 to 5%, preferably 0.5 to 3% are often preferred. However the invention is usefully applied to a range of mill sludges, typically having contents in the range 1 to 10% or higher. Mill wastes, or sludges, that may be treated in the invention include newsprint sludge and tissue mill sludge.

The solids content of this slurry typically contains 10 to 70% (often 20 to 40%) by weight cellulosic fibres (including, 0 to 80% (often 30 to 70%) pigment and other inorganic filler, and 5 to 50% (often 10 to 30%) insoluble ink and/or stickies. The ink may have initially been water insoluble or may have been insolubilised during the process.

The invention is of particular value when the suspension comprises material at least 5% by weight (based on total solids) insoluble ink particles. Such a suspension is obtained in a paper deinking process and thus the process of the invention is preferably incorporated as part of a paper deinking process and results in the production of a cake of waste material that may then be dumped. In particular, the suspension is preferably the hydrophobic reject suspension obtained in a paper deinking process by subjecting a suspension of paper fibres, filler and ink to flotation and thereby separating a hydrophobic reject suspension from a hydrophilic accept fraction. Frequently the hydrophobic reject suspension is a blend of suspensions collected from two or more flotation stages in the overall deinking process. Such a process is illustrated diagrammatically in the accompanying flow diagram.

Cellulosic material that is contaminated with ink (e.g., printed newsprint or printed cardboard) is subjected to a pulping and deinking process that generally involves a series of steps including various bleaching and screening steps (that are not shown) to form an aqueous pulp that is passed along line 1 to a dewatering stage 2. This dewatering stage is generally an air flotation stage in which the ink-containing solids are floated off as a Reject slurry, that is removed along line 3 to a collection vessel 4, while the hydrophilic Accept liquor is passed through line 5 to one or more stages 6 in which the liquor is concentrated (e.g., by drum or other filtration) and the solids in it are washed and filtered. The useful solids from these stages are taken through line 7 to a stock tower for recycling while ink-contaminated wash water is taken by line 8 towards a Krofta clarifier or other flotation cell 9. The hydrophobic Reject slurry that is floated in this cell is taken by line 10 to the vessel 4, while water can be removed by line 11 and recycled.

Chemicals to promote the flotation can be added at the dosing system 12.

In addition to feeding the reject slurries from flotation cells 2 and 9 to the vessel 4, frequently other reject solids, for instance general mill effluent solids, may be fed to it through line 13 to form a mixed mill waste or sludge.

The flotation stage or stages may be conducted as dispersed air flotation processes in which air at atmospheric pressure is forced into the liquor, or they may be conducted as dissolved air flotation processes in which the in-flowing liquor is pressurised in the presence of air so as to dissolve air in the liquor, and the pressure is released in the flotation cell (or alternatively the inflowing liquor may be under atmospheric pressure and the flotation cell may be under reduced pressure). Irrespective of the precise manner of effective air flotation, the central feature is that solids are floated to form a Reject fraction, and the clarified liquor remains as the Accept fraction.

The slurry accumulated in vessel 4 is passed through line 14 and dosing system 15 to an Andritz or other belt press 16 where it is subjected to pressure filtration to produce a water effluent removed through pipe 17 and a cake that can be removed, for instance as shown at 18, and can then be dumped, for instance as landfill.

The use of a belt press is particularly preferred.

The cationic polymer that is used in the invention can be a natural cationic polymer such as chitosan or a modified natural cationic polymer such as cationic starch. Preferably however the polymer is an organic synthetic polymer that is substantially water soluble and that is formed by polymerising one or more ethylenically unsaturated monomers, in generally acrylic monomers, that consist of or include cationic monomer. Suitable cationic monomers are dialkylaminoalkyl (meth) acrylates and dialkylaminoalkyl (meth) acrylamides, either as acid salts or preferably as quaternary ammonium salts. The alkyl groups may each contain 1 to 4 carbon atoms and the aminoalkyl group may contain 1 to 8 carbon atoms. Particularly preferred are dialkylaminoethyl (meth) acrylates, dialkylaminoethyl (meth) acrylamides and dialkylaminopropyl (meth) acrylamides. These cationic monomers are preferably copolymerised with a non-ionic monomer, preferably acrylamide. Cationic amphoteric polymers (including a minor amount of anionic groups) can also be used. Preferred polymers are particulate as in EP 202780.

Various other cationic polymers that may be used include polyethylene imines, dicyandiamide polymers, polyamine epichlorhydrin polymers and polymers of diallyl monomers such as diallyl dimethyl ammonium chloride, either as homopolymer or copolymer with acrylamide or other comonomer.

It is usually preferred that the polymer has sufficiently high molecular weight (e.g., intrinsic viscosity above 4 dl/g) that it is a bridging flocculant and preferred polymers have IV above 6, and usually above 8, dl/g. Intrinsic viscosity is determined at 25° C. in 1N sodium chloride solution buffered to pH 7 using a suspended level viscometer.

Although these high molecular weight polymers are generally preferred, in some processes it is preferred that the cationic polymer that is added to the suspension has a sufficiently low molecular weight that the flocculation process can more properly be described as coagulation. Preferably the molecular weight of the polymer is such that IV is not above 3 dl/g, e.g., 0.2 to 3 dl/g or molecular weight 50,000 to 2 million. Suitable low molecular weight polymers of this type are low molecular weight versions of polymers of one or more ethylenically unsaturated monomers including cationic monomer, as discussed above, and the polyethyleneimine dicyandiamide, polyamine epichlorhydrin polymers, and polymers of diallyl monomers, as discussed above.

The cationic polymer generally has a relatively high charge density, for instance above 0.2 and preferably 0.4 to 2.5 equivalents of cationic nitrogen per kilogram of polymer. When the cationic polymer has IV below about 3 dl/g the cationic content is preferably relatively high. For instance the polymer may be a substantial homopolymer or formed from a monomer blend at least 50% and generally at least 80%, by weight cationic monomer, any remaining monomer generally being acrylamide or other non-ionic monomer. At higher molecular weight it can be satisfactory for the amount of cationic monomer to be, for instance, 8 to 40, often around 10 to 20, mole percent, (preferably 10 to 70 weight percent).

In some instances it is desirable to include a relatively low molecular weight cationic polymer (for instance a relatively highly charged cationic polymer having molecular weight 50,000 to 2 million) as a coagulant followed by a higher molecular weight cationic polymer, for instance to act as a bridging flocculant, followed by the anionic colloidal material. For instance the coagulant can remain from an earlier stage in the process and the flocculant can be added to the slurry prior to pressure filtration.

Although the process can be conducted with relatively low degrees of mixing, with the result that there is little or no degradation of the initial flocs before the anionic colloidal material is added, it is often preferred to break the flocs down into smaller flocs before adding the anionic colloidal material. This reduction in floc size can be achieved by applying stirring or other agitation to the flocculated suspension. Naturally the extent of agitation must not be so great that the initial solids are resuspended in the aqueous suspension but it is possible, particularly if relatively large amounts of the cationic polymer flocculant are used, to choose a degree of agitation that breaks the initial flocs down to microflocs that are stable in the system against further reduction in size, and which are then aggregated by the anionic colloidal material. An advantage of reducing the floc size in this manner is that it can facilitate dewatering to a higher solids content compared to the solids content than is conveniently available if the flocs do not undergo size reduction before adding the anionic colloidal material. Size reduction of the flocs by agitation is particularly desirable when the polymer has IV above 4 dl/g.

The addition of cationic polymer is made at some position ahead of the belt press or other pressure filtration apparatus and anionic colloidal material is added after the polymer addition but before the pressure filtration stage. There must be sufficient interval between the two points of addition to allow flocculation to occur and, as indicated above, it can be desirable to apply sufficient mixing or other shear between the two points of addition so as to break down the initial flocs that are formed into microflocs.

The anionic colloidal material can be a micro emulsion of water-insoluble anionic organic polymer (for instance having a particle size below 0.2 µm), or it can be an anionic inorganic polymer such as colloidal silicic acid or a derivative thereof; but preferably it is an anionic swelling clay. Such clays are known to swell to a very large extent when the dry clay is contacted with water. They are generally smectites and are frequently montmorillonites. Suitable materials are referred to as bentonites such as Wyoming bentonite, or Fullers Earth. The bentonite or other clay may have been chemically modified, e.g., by alkali treatment to convert calcium bentonite to alkali metal bentonite. The bentonite or other clay preferably swells by at least 10 or 20 times its own volume and the dry clay is contacted with water and the surface area of the anionic colloid before swelling is preferably at least 30 m²/g and the surface after swelling is preferably at least 400, e.g. up to 800 m²/g.

Polysilicic acid derivatives having surface area up to, for instance, 1,500 m²/g can be used.

The bentonite or other clay may be provided as a powder that is mixed with water to form a slurry for convenient addition to the aqueous suspension, or may initially be provided as a slurry, and this in turn may be provided as a concentrated slurry that contains low molecular weight sodium polyacrylate or other dispersing agent or other material that will render the concentrate sufficiently fluid for ease of handling.

The amounts of cationic polymeric flocculant and anionic colloidal material used in the invention will depend upon the suspension that is being treated and the degree of agitation that is applied and the nature of the pressure dewatering process. The optimum can be determined by routine screening. If the flocculated suspension is to be agitated significantly prior to adding the anionic colloidal material, it is desirable to include sufficient cationic polymer to ensure that the microflocs that are present after the agitation all carry a relatively heavy cationic charge due to the flocculant polymer. The amount of polymer that is included in the suspension is generally at least 2 ppm (based on the weight of suspension) and is generally at least 5 or 10 ppm. It can be up to, for instance, 500 ppm but the amount is generally below 100 ppm and is frequently below 50 ppm. Values of 5 to 50, often around 20 to 30, ppm are often preferred. These are all based on the total weight of suspension. Based on the solids content of the suspension, the amounts typically are at least 0.1% and often at least 0.5%, but generally below 5% and often below 2%, by weight of the solids content of the dispersion.

The amount needed for optimum results may be reduced if the suspension already contains cationic polymer from a previous stage, for instance from a previous flotation stage.

The amount of anionic colloidal material is generally at least 10 ppm and usually at least 50 ppm and preferably at least 100 ppm, based on the weight of the dispersion. The amount is generally below 500 ppm and frequently it is below 250 ppm. Amounts around 50 to 150 ppm are often preferred. These amounts are based on the weight of the aqueous suspension that is to be subjected to the pressure filtration. Based on the solids content of the suspension, the amounts typically are above 0.1% and generally above 0.3% and often above 1%, but the amount is generally below 5%, and preferably below 3% by weight.

In addition to providing the cationic polymeric flocculant in the suspension and then aggregating it by adding anionic colloidal material prior to pressure filtration, it can be desirable to add further cationic polymeric flocculant to the suspension after adding the anionic colloidal material and before the pressure filtration. This added cationic material is generally of high molecular weight (for instance intrinsic viscosity above 4 dl/g at 25° C. in 1N sodium chloride solution) and can have relatively low charge density, for instance being formed from 3 to 25 mole percent, often 8 to 15 mole percent, cationic monomer with the balance acrylamide.

It is generally preferred that the solids in the resultant cake are used or dumped without further drying (for instance by heating or combustion) but if desired they can be subjected to further treatment before use or dumping. The solids content is preferably above 30%, most preferably above 35 or 40%. The precise value which is satisfactory in any particular process depends on, inter alia, the nature of the suspended solids and whether or not the cake is to be dumped or incinerated. However, the post-treatment with the anionic colloidal material in accordance with the invention does allow for a useful increase in the solids content of the cake without undesirable reduction in the filtration rate.

The following are some examples of the invention.

EXAMPLE 1

Waste inked paper is pulped in the presence of alkali silicate and chelating agent, bleached and filtered and soap is then added to the suspension.

Referring to the drawing, the suspension is then subjected to air flotation at 2 to form a first Reject slurry (line 3) and an Accept liquor which is thickened and washed at 6 by suction drainage or passage over a drum thickener or screw press, and the filtrate is taken to a clarifier 9 while the solids are rewashed and again filtered, with the washings being taken to the clarifier.

This clarifier 9 is a Krofta flotation cell in which the liquor is subjected to air flotation with the clarified Accept liquor being recycled to the pulping stage and a second Reject slurry being collected.

The first and second Reject slurries are mixed together at 4 to form a slurry having a solids content of which about 50% is filler, 30% fibre fines and 20% ink. The addition of the second Reject is desirable as it increases the fibre content of the combined slurry and so improves its handling. Additives are dosed into the slurry at the dosing system 15 and the resultant treated suspension can then be dewatered by belt press 16 to produce a cake.

In order to determine the suitability of additives for producing a cake, samples of the suspension being fed into the dosing system 15 were subjected to two different treatments.

In a process in accordance with the invention, the sample was treated with 25 ppm homopolymer of diallyldimethyl ammonium chloride having IV 2 dl/g being mixed into the slurry followed by 100 ppm bentonite followed by 100 g/t of 10 mole % quaternised dimethylaminoethyl acrylate and 90 mole % acrylamide and having IV above 8 dl/g.

In a comparative process, the sample was treated with bentonite followed by high molecular weight non-ionic polyacrylamide followed by high molecular weight non-ionic polyacrylamide followed by the same high molecular weight cationic polymer as in the process of the invention.

In each test, the solids content of the suspension was about 1.5%. The capillary suction time was determined and it was found that the process of the invention gave a shorter capillary suction time than the process using bentonite followed by non-ionic polymer. This suggests that dewatering by belt pressing would be more effective and faster.

EXAMPLE 2

A mill waste having a solids content of about 3% was formed of deinking waste, Krofta sludge, effluent Krofter sludge and a small amount of activated sludge. In commercial practice a proprietary cationic polymeric flocculant is added at 3 kg/t and the flocculated suspension is then dewatered using Andritz presses to form a cake having a dry matter content of 35 to 40%, which is then dumped.

In order to compare the variations in solid content using different flocculant systems, samples of the same sludge were treated in the laboratory with the systems under test and were then dewatered in a portable piston press. This gives a lower solids content than is obtainable by the commercial Andritz press but allows for relative dewatering to be observed, namely whether the particular flocculant system gives better dewatering performance than the proprietary treatment.

In each instance, the polymer is added at 3 kg/t. When bentonite is added, it also is added at a dose of 3 kg/t.

In each test the additive is mixed into the sludge sample. The treated sample is poured onto the fabric in the cylinder in the portable piston press, the time taken for free water drainage is recorded, the piston is then inserted onto the sludge mat and a fixed pressure applied for a fixed time, the pad is removed and its solid content determined. When bentonite is added, the polymer is mixed into the suspension first and the bentonite is then mixed into it.

The results are set out in the following table. The polymer labelled as a commercial is thought to be a high molecular weight cationic polyacrylamide and all the other polymers are polymers having IV above 6 dl/g and which are copolymers of acrylamide with quaternised dimethylaminoethyl acrylate approximately in the weight percentage shown in the table.

| Polymer | Bentonite | Free Drainage (seconds) | % cake solids |
| --- | --- | --- | --- |
| Commercial | No | 12 | 28.2 |
| A 50% cationic | No | 8 | 30.7 |
|  | Yes | 5 | 32.9 |
| B 20% cationic | No | 16 | 28.6 |
|  | Yes | 14 | 31.6 |
| C 15% cationic | No | 10 | 28.9 |
|  | Yes | 3 | 33.1 |
| D 80% A + 20% B | No | 8 | 30.6 |
|  | Yes | 5 | 32.9 |

These results show that the post addition of bentonite in these tests does significantly improve the cake solids and the rate of dewatering.

In further tests, the treatment using Polymer A without bentonite is modified by applying vigorous mixing to the flocculated suspension before drainage. Although this increases the cake solids to 33%, it also increases the free drainage time unacceptably, to 56 seconds. When this process is repeated but with the addition of bentonite after the prolonged mixing, the cake solids is 33.9% and the free drainage was 7 seconds. These results show that the cake solids improved still further by shearing between the addition of the polymer and the bentonite. They show that these increased cake solids values can be obtained with satisfactory short free drainage times but that the drainage time is unsatisfactory when the system is sheared after flocculation, without post-addition of bentonite.

From a consideration of these results, it is predictable that the processes using polymer followed by swelling clay would give a useful improvement in cake solids, with satisfactory or improved filtration rate, when applied on the Andritz presses.

We claim:

1. A process for separating suspended solids from an aqueous suspension of at least 0.1% by weight suspended solids comprising 10 to 70% cellulosic fibres and 5 to 50% hydrophobic material, the process comprising mixing an effective amount of water-soluble cationic polymer flocculant into the suspension and thereby flocculating the solids, then adding and mixing into the flocculated solids an effective aggregating amount of an anionic colloidal material and thereby forming an aggregated suspension of aggregated solids, and then separating the aggregated solids from the aggregated suspension as a cake by subjecting the aggregated suspension to centrifugal force or by pressure filtration with a filter press, screw press, belt press or tube press wherein the cationic polymer has intrinsic viscosity of at least 0.2 dl/g and is selected from the group consisting of polymers of diallyl dimethyl ammonium chloride and acid addition salt or quaternary salt polymers of dialkylaminoalkyl (meth) acrylates or dialkylaminoalkyl (meth) acrylamides and said anionic colloidal material is selected from the group consisting of anionic swelling clays, anionic water insoluble organic polymer microemulsions and anionic silicic acid polymers.

2. A process according to claim 1 in which the cationic polymeric flocculant has intrinsic viscosity of at least 2 dl/g and the anionic colloidal material is selected from anionic water insoluble organic polymer microemulsions and anionic silicic acid polymers.

3. A process according to claim 1 in which the anionic colloidal material is an anionic swelling clay.

4. A process according to claim 1 in which the cationic polymer comprises polymer which has IV 0.2 to 3 dl/g and is formed from monomer of which at least 50% by weight is cationic.

5. A process according to claim 4 in which the suspension containing the aggregated solids is flocculated by adding a second cationic polymeric flocculant before the pressure filtration, wherein the second polymeric flocculant has IV at least 4 dl/g.

6. A process for separating suspended solids from an aqueous suspension of at least 0.1% by weight suspended solids comprising cellulosic fibres and hydrophobic material, the process comprising mixing an effective amount of water-soluble cationic polymer flocculant into the suspension and thereby flocculating the solids, then adding and mixing into the flocculated solids an effective aggregating amount of an anionic colloidal material and thereby forming an aggregated suspension of aggregated solids, and then separating the aggregated solids from the aggregated suspension as a cake by subjecting the aggregated suspension to centrifugal force or by pressure filtration with filter press, screw press, belt press or tube press wherein the cationic polymer has intrinsic viscosity at least 2 dl/g and is selected from the group consisting of polymers of diallyl dimethyl ammonium chloride and acid addition salt or quaternary salt polymers of dialkylaminoalkyl (meth) acrylates or dialkylaminoalkyl (meth) acrylamides, and said anionic colloidal material is selected from the group consisting of anionic swelling clays, anionic water insoluble organic polymer microemulsions and anionic silicic acid polymers where the suspension contains 10 to 70% by weight cellulosic fibres, 0 to 80% by weight filler and 5 to 50% by weight insoluble ink.

7. A process according to claim 6 in which the flocculated solids are broken down to microflocs by stirring before adding the anionic colloidal material.

8. A process according to claim 6 in which the suspension comprises mill effluent solids.

9. A process according to claim 6 in which the suspension comprises waste from a paper deinking process.

10. A process for separating suspended solids as a cake from an aqueous suspension including deinking waste and which comprises 10–70% by weight cellulosic fibres and 5–50% by weight hydrophobic material including insoluble ink and which has a suspended solids content of at least 0.1% by weight, wherein the process comprises flocculating the suspension by adding an effective flocculating amount of a cationic polymer which is water-soluble polymer having intrinsic viscosity at least 2 dl/g selected from the group consisting of polymers of diallyl dimethyl ammonium chloride and acid addition salt polymers and quaternized polymers of dialkylaminoalkyl (meth) acrylates and dialkylaminoalkyl (meth) acrylamides and thereby forming flocculated solids, then adding and mixing into the flocculated solids an effective amount of anionic swelling clay with the flocculated solids to form an aggregated suspension of aggregated solids, and then separating the aggregated solids from the aggregated suspension as a filter cake by belt pressing.

11. A process according to claim 10 in which the cationic polymer has IV at least 4 dl/g.

* * * * *